(12) United States Patent
Seppi

(10) Patent No.: US 12,194,472 B2
(45) Date of Patent: Jan. 14, 2025

(54) CHOPPING AND CUTTING MACHINE

(71) Applicant: SEPPI M. SPA AG, Caldaro (IT)

(72) Inventor: Lorenz Seppi, Caldaro (IT)

(73) Assignee: SEPPI M. SPA AG, Caldaro (IT)

( * ) Notice: Subject to any disclaimer, the term of this patent is extended or adjusted under 35 U.S.C. 154(b) by 540 days.

(21) Appl. No.: 17/603,036

(22) PCT Filed: Apr. 20, 2020

(86) PCT No.: PCT/EP2020/060961
§ 371 (c)(1),
(2) Date: Apr. 19, 2022

(87) PCT Pub. No.: WO2020/216700
PCT Pub. Date: Oct. 29, 2020

(65) Prior Publication Data
US 2022/0371024 A1   Nov. 24, 2022

(30) Foreign Application Priority Data

Apr. 23, 2019   (IT) .................. 102019000006240

(51) Int. Cl.
*B02C 18/18*  (2006.01)
*B02C 18/14*  (2006.01)

(52) U.S. Cl.
CPC ............ *B02C 18/18* (2013.01); *B02C 18/145* (2013.01); *B02C 2018/188* (2013.01)

(58) Field of Classification Search
CPC ............................ B02C 18/18; B02C 18/145
See application file for complete search history.

(56) References Cited

U.S. PATENT DOCUMENTS

| | | | | |
|---|---|---|---|---|
| 3,658,265 A * | 4/1972 | Johnson | ................ | B02C 18/145 241/243 |
| 6,305,623 B1 * | 10/2001 | Sotsky | .................. | B02C 18/145 241/73 |
| 6,837,453 B2 * | 1/2005 | Sturm | .................. | B27L 11/005 241/243 |
| 7,004,413 B2 * | 2/2006 | Langlois | ............... | B02C 18/184 241/242 |
| 8,061,640 B2 * | 11/2011 | Cotter | ..................... | B02C 18/18 241/189.1 |
| 8,967,515 B2 * | 3/2015 | Pallmann | ............... | B02C 18/145 241/293 |
| 9,168,535 B2 * | 10/2015 | Roozeboom | ............ | B02C 18/22 |
| 9,333,508 B2 * | 5/2016 | Denis | ..................... | A01G 23/00 |

(Continued)

FOREIGN PATENT DOCUMENTS

| | | | | |
|---|---|---|---|---|
| DE | 20310251 U1 * | 12/2004 | .......... | B02C 18/145 |
| EP | 2 363 017 | 9/2011 | | |

(Continued)

*Primary Examiner* — Faye Francis
(74) *Attorney, Agent, or Firm* — Jacobson Holman PLLC

(57) ABSTRACT

A machine for shredding/cutting (200) biomass including a frame (201) in which a tool holder rotor (100) is rotatably mounted on and which a number of tools (103) are arranged. The tools (103) are arranged in conduits (105) which are formed by side walls (104) and are arranged in a conduit (105) in which at least one inclined deflection element (102) is arranged in front of the tool, and wherein additional further deflection elements (202) are arranged opposite the conduits (105) on the frame (201).

8 Claims, 6 Drawing Sheets

(56) References Cited

U.S. PATENT DOCUMENTS

| | | | |
|---|---|---|---|
| 2010/0044487 A1* | 2/2010 | Labbe | B02C 18/146 |
| | | | 241/293 |
| 2012/0067188 A1* | 3/2012 | Denis | A01D 34/52 |
| | | | 83/665 |
| 2013/0099039 A1* | 4/2013 | Gaudreault | B02C 18/18 |
| | | | 241/291 |
| 2014/0217220 A1* | 8/2014 | Weinberg | B02C 18/145 |
| | | | 241/282.1 |
| 2017/0079219 A1 | 3/2017 | Stanley et al. | |
| 2017/0106375 A1* | 4/2017 | Gaudreault | A01G 23/093 |
| 2017/0297032 A1* | 10/2017 | Denis | B02C 18/18 |
| 2020/0197947 A1* | 6/2020 | Verzilli | B02C 18/145 |

FOREIGN PATENT DOCUMENTS

| | | |
|---|---|---|
| EP | 2 818 248 | 12/2014 |
| EP | 3 315 201 | 5/2018 |

\* cited by examiner

CHOPPING AND CUTTING MACHINE

BACKGROUND OF THE INVENTION

The present invention relates to a movable shredding and cutting machine according to the claims.

Technical Area

Machines, used to crush and cut material, for example for biomass, may have different designs/compositions for different purposes. Different tools may require different cutting depth. In this specification the tool refers to a tool which is mounted in a suitable tool holder seat which in turn is attached to a tool holder rotor.

State of the Art

US 2017/079219 relates to a ring to control the cutting and/or chopping which comprises a cutting depth control ring. This ring has a first end and a second end. There is a tool holder located between the first and the second end where the ring is connected to the rear part of the tool holder and is at least partially arranged in front of the body of the cutting tool.

The ring described must be mounted on the rotor to which the tool holders are attached. The material moved to the chopper end can travel to side of the cutting tool or over the cutting tool.

CA253198 describes a tubular cylindrical base for cutting heads. A number of cutting tools mounted on the outer surface are mounted on the cylindrical base. Each of the cutting tools is assigned a guard which is attached to the cylindrical surface.

The ring described must be mounted on the rotor to which the tool holders are attached; the material to be shredded can can travel to the side of the cutting tool or over the cutting tool.

EP 2 363 017 describes a shredding device for plants with a substantially cylindrical chamber. The cutting chamber comprises a number of side walls, dividing the cutting areas. This device is fixed and powered by a power cord. The individual side walls are connected via metal sheets. These sheets are used to calibrate the device.

In the case of shredding machines, the problem often arises that the shredded material is not shredded uniformly and after the material has passed the shredding machine, biomass or the like remains uncut and not uniformly shredded. This is due in particular to the cutting depth and/or to the deflection of the material to be shredded, which can drift off to the side or above the cutting tool.

This problem causes a number of disadvantages. Problems with the force used may arise in particular when the cutting depth is too deep, as the force is insufficient to crush the material. Also, if the shredded material is too long, problems with composting the biomass may arise as it can take longer.

SUMMARY OF THE INVENTION

The object of the present invention is to provide a shredding/cutting machine which guarantees uniform cutting of the biomass and the like, wherein a too deep cutting depth is avoided which could block the machine.

This goal is achieved by means of a shredding/cutting machine according to the claims.

The generic term relates to a shredding/cutting machine, in particular for biomass and the like, comprising a frame in which a tool holder rotor is rotatably mounted on which a number of tools are arranged.

According to the invention, the tools are arranged in conduits which are formed by side walls and comprise at least one inclined element which is arranged in front of the tool, and the element covers at least 60% of the width between the walls in the conduit.

The inclined element advantageously covers the entire width between the two side walls. A further wall is advantageously arranged in the centre of the conduit formed by the walls in order to divide the conduit at least partially along the circumference of the tool holder rotor.

The predisposed inclined element provided may also consist of several individual elements.

Deflection elements are advantageously arranged along the width of the tool holder rotor on the frame holding the tool holder rotor, thereby preventing the material to be shredded from leaving the cutting area and not being cut by the tools arranged on the tool holder rotor. Deflection elements are advantageously arranged opposite the cutting tools, which are arranged in the conduits formed by the walls.

DESCRIPTION OF THE DRAWINGS

Further characteristics and details of the invention emerge from the claims and from the following description of a preferred, non-restrictive embodiment which is illustrated in the accompanying drawings, wherein:

DETAILED DESCRIPTION OF THE INVENTION

Figure 1:
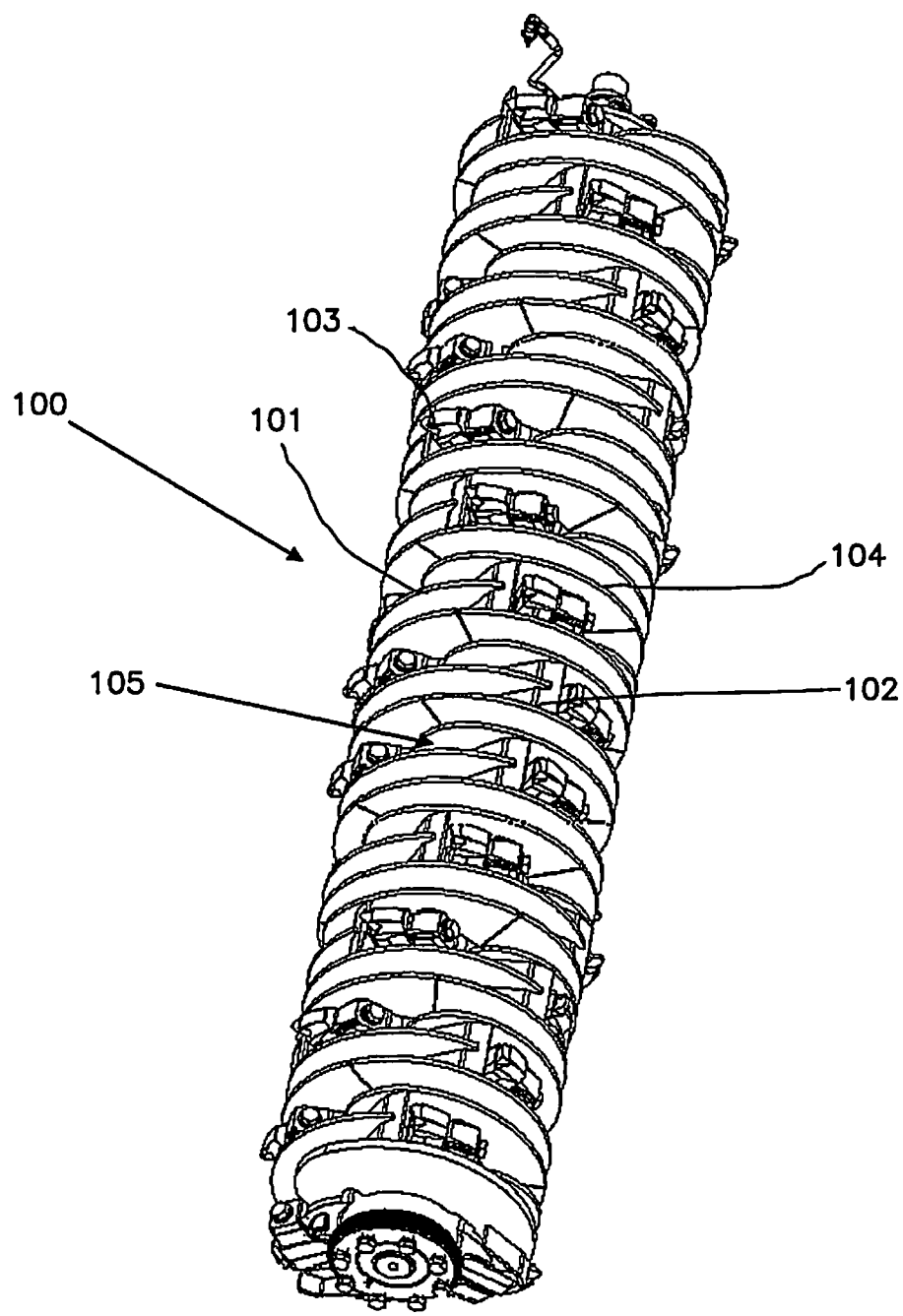
FIG. 1 is a perspective view of a tool holder rotor according to the invention.
Figure 2:
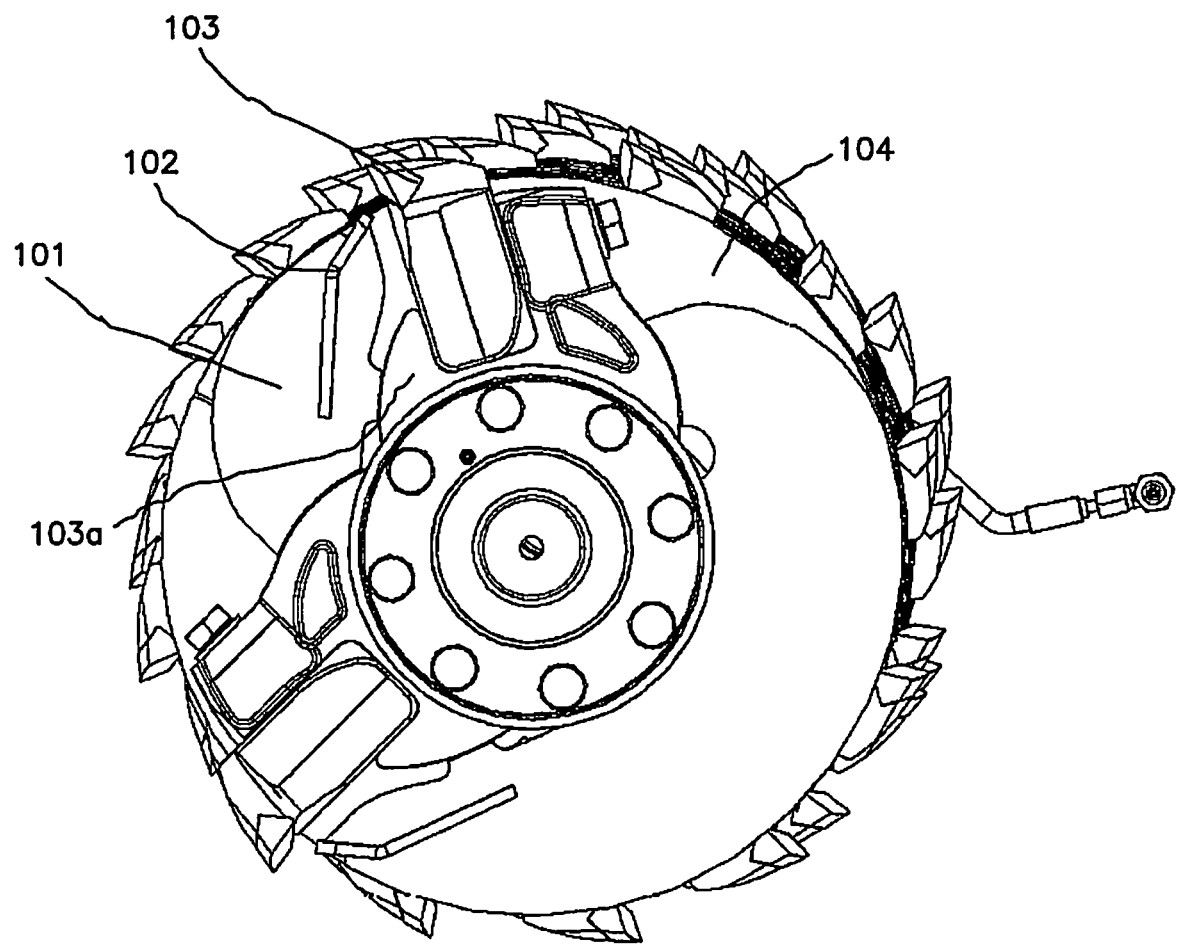
FIG. 2 is a side view of a tool holder rotor according to the invention.
Figure 3:
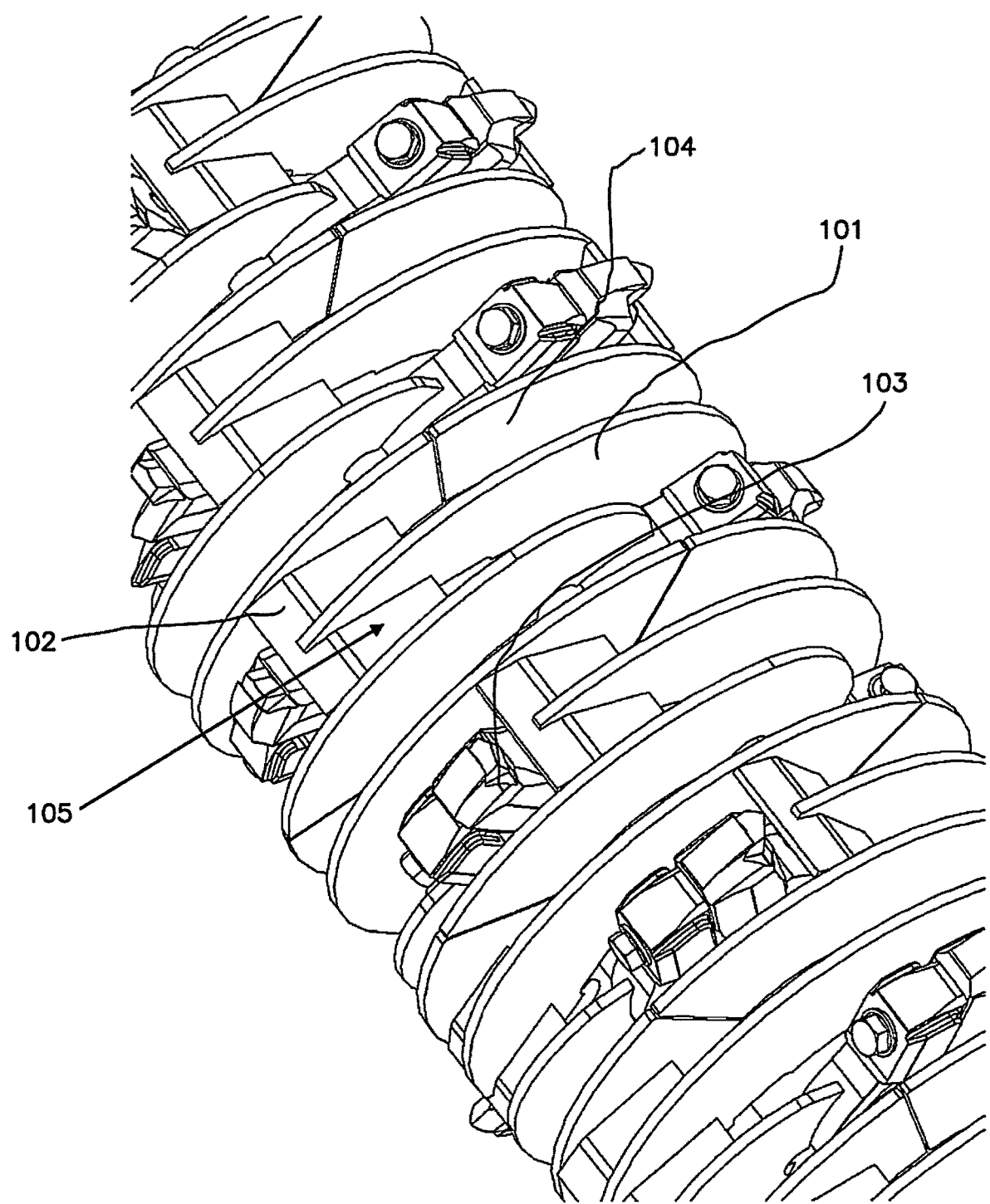
FIG. 3 is a perspective partial view of a tool holder rotor according to the invention.
Figure 4:
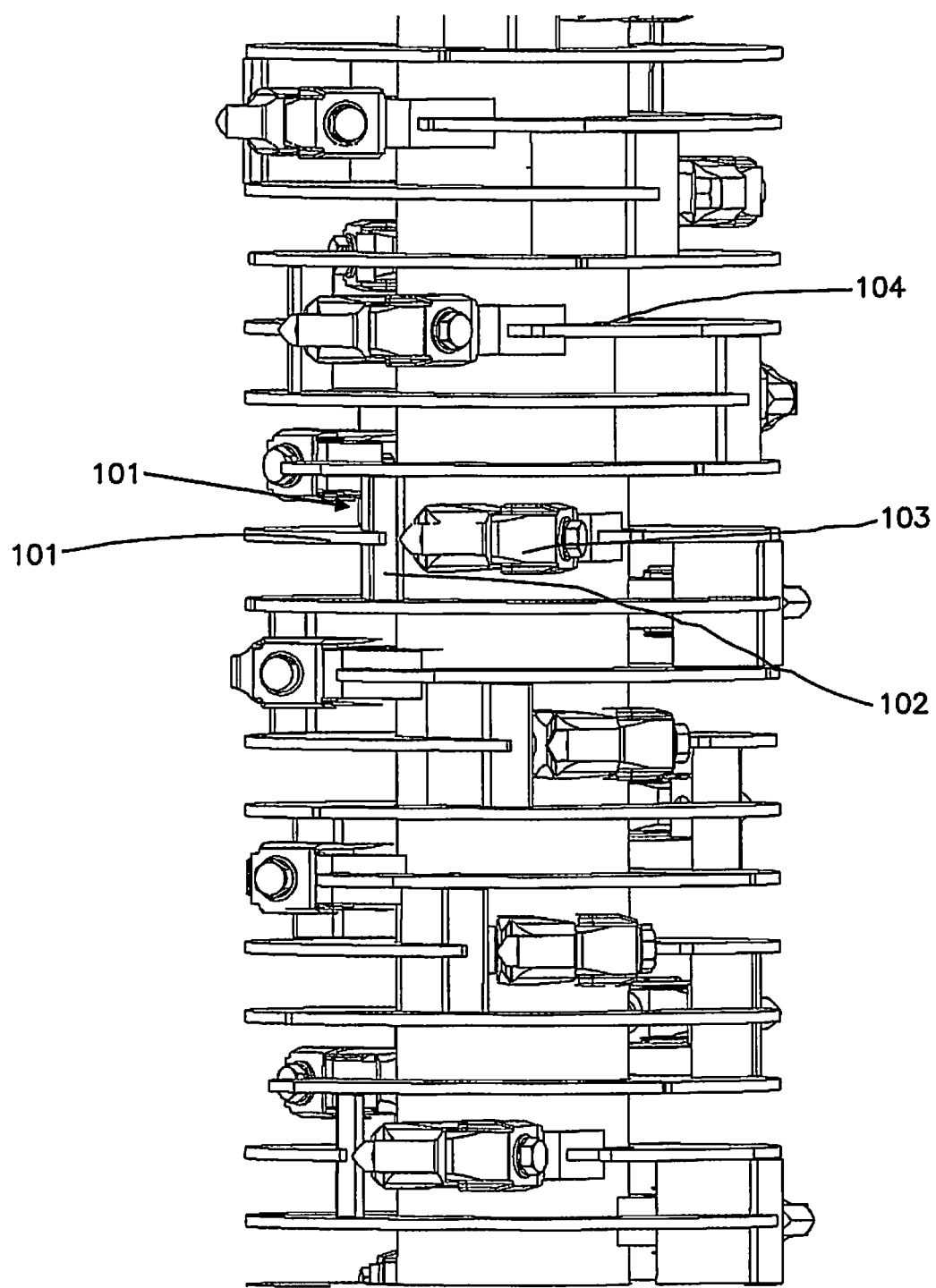
FIG. 4 is a top view of a tool holder rotor with a guard according to the invention.
Figure 5:
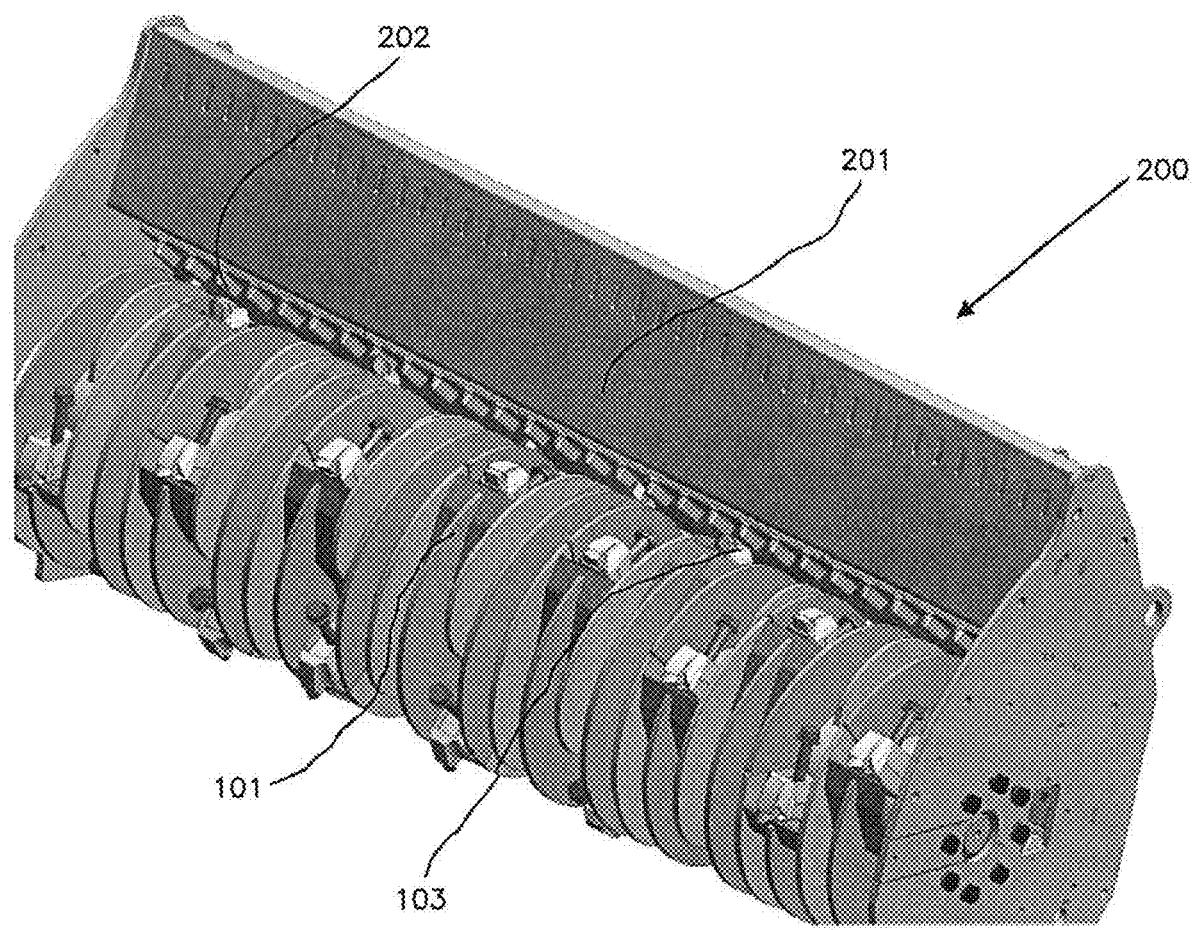
FIG. 5 is a perspective view of a shredding machine according to the invention.
Figure 6:
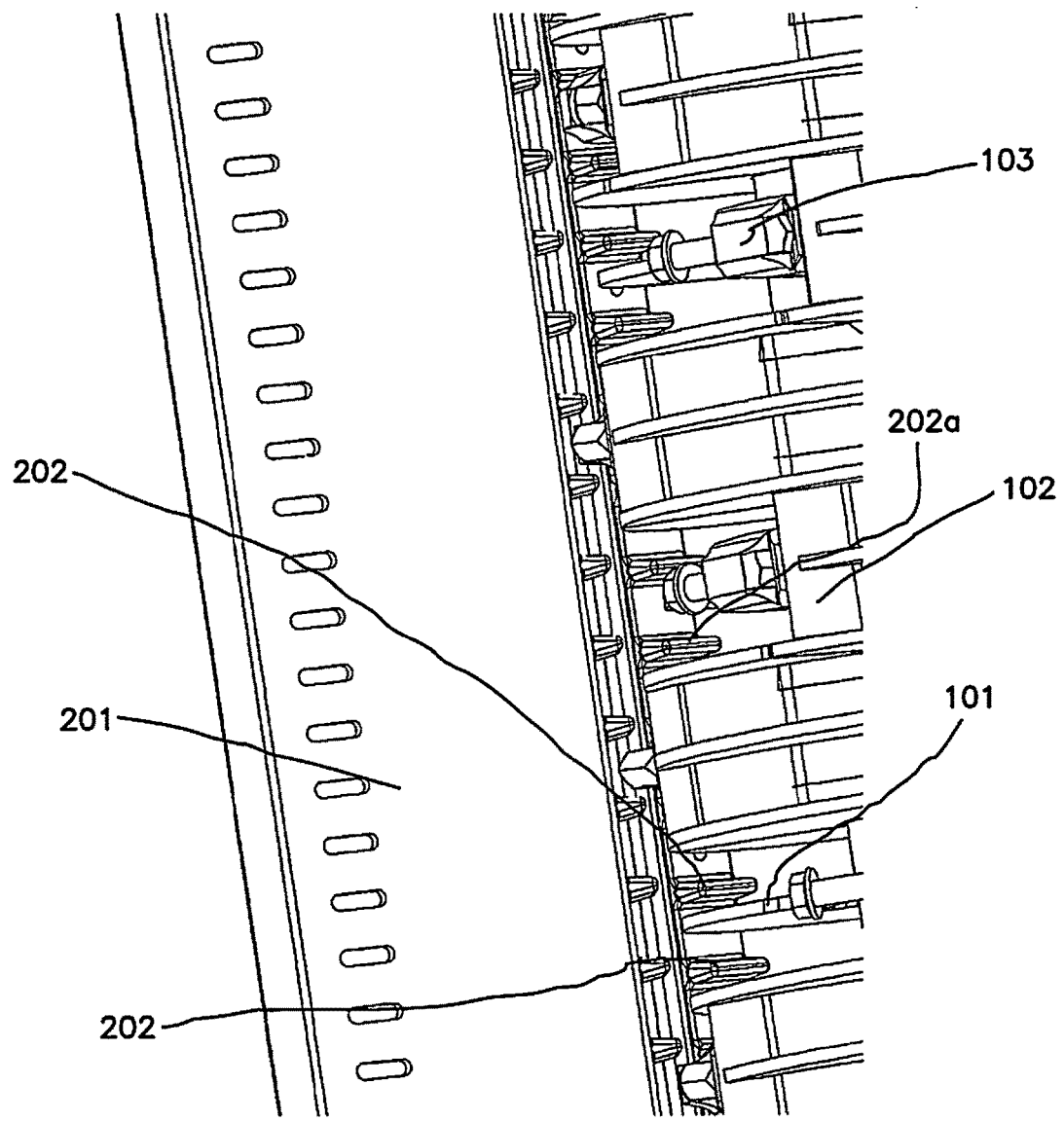
FIG. 6 is an enlarged perspective view of a shredding machine according to the invention.

In FIG. 5, the reference numeral 200 denotes a machine for shredding and cutting biomass and the like. The reference numeral 201 denotes a frame in which a tool holder rotor 100 is rotatably mounted. The tool holder rotor 100 is driven, for example, by a transmission belt (not shown), which can be driven by means of a hydraulic motor or the like, or by means of a shaft driven by the vehicle carrying the shredding machine. A series of walls 104 are disposed on the tool holder rotor 100. These walls 104 form conduits 105 in which the tools 103 for cutting the biomass are supported by tool holders. When the tool holder rotor 100 rotates, the biomass enters the conduits 105. A deflecting element. 102 is arranged in front of the tools 103. This deflecting element is preferably inclined towards the tool 103. In this way, the deflecting element 102 deflects the biomass in the direction of the cutting tool 103. The deflecting element 102 covers at least 60% of the width between the walls 104 that form the conduits 105. The deflecting element 102 advantageously covers the entire width between the walls 104.

The tool 103 is received in a tool holder seat 103a. The deflecting element 102 advantageously overlays at least a part of the tool holder seat 103a.

The deflecting element 102 advantageously adjoins the tool 103 and/or the tool holder seat 103a, at least in its upper part.

The deflecting element 102 may also consist of several parts, but consists advantageously of a single sheet.

a further wall/partition 101 is advantageously arranged in the conduit 105 formed by the walls 104, which is advantageously arranged centrally between the walls 104 and extends along the circumference of the tool holder rotor 100.

This partition wall 101 can form a side wall for a subsequent conduit 105 in which a further cutting tool 103 is arranged.

A plurality of cutting tools 103 can be arranged in the same conduit 105 which formed by the walls 104.

Further deflection elements 202 can advantageously be arranged on the frame 201. These deflection elements are advantageously arranged opposite the conduits 105 formed by the walls 104 on the frame. At least two further deflection elements are advantageously provided per conduit 105 and are arranged laterally to the cutting tools 103. In this way, these further deflection elements 202 deflect the biomass flowing in the conduits in the direction of the cutting tools 103, which are deflected by the deflection element 102 to the outside of the rotor n the direction of the frame 201. In order to avoid that this material is not cut or shredded, the deflection elements deflect the material in the conduits 105 and thus enable a fine and even shredding.

In a preferred embodiment, the further deflecting element 202 is connected to the frame of the machine 201 by means of a detachable connection.

Furthermore, the further deflecting element 202 may have a cutting element 202a in order not only to deflect and/or block the flow of material, but also to shred and/or cut the material.

Finally, it is clear that additions, changes or variants that are obvious to a person skilled in the art can be made on the machine 200 described Up to now without departing from the scope of protection defined by the appended claims.

REFERENCE NUMBERS

100 Tool holder rotor
101 Partition wall
102 Deflecting element
103 Tool
103a Tool holder seat
104 Walls
105 Conduit
200 Machine for shredding and cutting material
201 Frame
202 Further deflecting element
202a Cutting edge of the further deflecting element

The invention claimed is:

1. A machine for shredding/cutting of biomass, comprising a frame in which a tool holder rotor is rotatably mounted on which a row of tools is arranged, wherein each tool in the row of tools is arranged in a conduit formed by side walls and also arranged in the conduit is at least one inclined deflecting element is arranged in front of each tool, and wherein additional deflecting elements are arranged opposite the conduit on the frame.

2. The shredding/cutting machine according to claim 1, wherein each inclined deflecting element extends over an entire width between the side walls forming each conduit.

3. The shredding/cutting machine according to claim 1, wherein at least two inclined deflecting elements are arranged opposite one another in each conduit and laterally of each tool.

4. The shredding/cutting machine according to claim 1, wherein a further partition wall is arranged in each conduit and arranged centrally between the side walls.

5. The shredding/cutting machine according to claim 4, wherein the further partition wall forms the side wall of another conduit.

6. The shredding/cutting machine according to claim 1, wherein the tools arranged in the conduits are each in a tool holder seat and that the inclined deflecting elements each rest on a respective tool at least on its upper part or on the tool holder seat or overlays the tool holder seat.

7. The shredding/cutting machine according to claim 1, wherein the additional deflection elements are detachably connected to the frame.

8. The shredding/cutting machine according to claim 7, wherein the additional deflection elements have at least one cutting edge.

* * * * *